United States Patent Office 3,310,538
Patented Mar. 21, 1967

3,310,538
THIOTRITHIAZYL COMPOUNDS AS VULCANIZING AGENTS
Jerry Richard Albin, Wilmington, Del., assignor to E. I. du Pont de Nemours and Company, Wilmington, Del., a corporation of Delaware
No Drawing. Filed July 31, 1964, Ser. No. 386,751
5 Claims. (Cl. 260—79.5)

This invention relates to a new process for curing α-olefin hydrocarbon copolymers and the vulcanizates obtained thereby.

α-Olefin hydrocarbon elastomers containing sulfur-curable side-chain unsaturation are becoming commercially important today. Although vulcanizates made by curing these polymers with sulfur have displayed outstanding properties, it would be desirable to produce vulcanizates with improved heat resistance.

It has unexpectedly been found that the heat-aging properties of vulcanized α-olefin hydrocarbon copolymer elastomers can be improved, without a substantial sacrifice in other properties, by replacing sulfur as vulcanization agent with a thiotrithiazyl compound of the formula $$(NS)_3S-X$$

where X is a —Cl, —Br or —SCN group.

This invention is particularly valuable when applied to normally-solid, chain-saturated α-olefin hydrocarbon copolymers which contain sulfur curable side-chain ethylenic unsaturation. These rubber-like materials are made from at least one α-monoolefin and at least one non-conjugated hydrocarbon diene. The α-monoolefins have the structure R—CH=CH$_2$, where R is H or C$_1$–C$_{16}$ alkyl, and are preferably straight-chained. Representative dienes include open-chain C$_6$–C$_{22}$ dienes having the structure

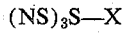

where R$_1$ is an alkylene radical, R$_2$ R$_3$ and R$_4$ are independently selected from the group consisting of hydrogen and alkyl radicals. Additional dienes include dicyclopentadiene; 5-methylene-2-norbornene; a 5-alkenyl-2-norbornene; a 2-alkyl-2,5-norbornadiene; cyclopentadiene; and 1,5-cyclooctadiene.

Representative procedures for making such copolymers are given in U.S. Patents 2,933,480, 3,000,866, 3,000,867, and 3,063,973. When cyclic non-conjugated dienes are employed, it is preferred that the reaction mixture contain ethylene and at least one other α-monoolefin, e.g., propylene. The ethylene copolymers should contain about 20 to 75 weight percent ethylene units in order to be rubber-like. Preferred ethylene copolymers have at least about 0.3 gram-mole sulfur-curable carbon-to-carbon double bonds per kilogram of polymer.

The thiotrithiazyl compounds are prepared according to procedures outlined in the examples. They may be represented by the structure

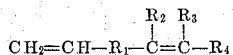

wherein the sulfur is represented as tetravalent.

The thiotrithiazyl compounds are not effective vulcanizing agents by themselves. Accelerators and activators are needed to obtain satisfactory rates and states of cure. The recipes familiar to those skilled in the art for sulfur curing of these above-described elastomers are satisfactory here. For example, active accelerators for use with thiotrithiazyl chloride are the thiuram sulfides and the various salts of N,N-dialkyldithiocarbamates. 2-Mercaptobenzothiazole is an excellent activator. Zinc oxide is another generally employed agent.

The state of cure of the vulcanizates is dependent on the amount of the thiotrithiazyl compound employed. Typically, adequate states of cure have been achieved with 2.5 parts of thiotrithiazyl chloride for each 100 parts of unsaturated polymer; this corresponds to a state of cure obtained using about 1.5 parts of sulfur. As mentioned above, the proportion of the accelerator used with sulfur can be employed here to give satisfactory acceleration. Those skilled in the art can modify the proportions by cut and try technique until optimum results are obtained for a particular application.

The stocks are frequently loaded with carbon black or mineral fillers or petroleum oil or mixtures of these agents before curing. The usual carbon blacks can be employed: the best results are obtained with the furnace blacks, particularly the high structure type; alternatively the channel blacks and even the thermal blacks can be used when desired. A wide variety of mineral fillers are mixtures thereof can be employed. Representative examples include: calcined kaolin clay, kaolin clay, blanc fixe, titanium dioxide, magnesium silicate, esterified silica and fine particle talc.

Optionally, still other components can be present for special purposes; thus antioxidants, pigments, antiozonants and the like can be added.

The composition can be made with any of the conventional mixing equipment. The stocks, accordingly, can be compounded on a rubber roll mill or in an internal mixer, such as a Banbury mixer or in a Struthers-Wells mixer. The effectiveness of the thiotrithiazyl compounds in the process of the present invention does not depend upon any particular or critical order of mixing.

The cure temperatures employed are those familiar in the rubber processing art. Vulcanization is accomplished by heating the compounded stock at temperatures of at least 130° C., preferably from about 130 to 160° C., for about 5 to 60 minutes. Steam cures can be employed also. The steam pressure can range between about 75 (160° C.) and 225 (203° C.) pounds per square inch and the time between about 20 minutes and 30 seconds. Higher temperatures and higher steam pressures will permit shorter cure times. The time and temperature needed will depend somewhat on the nature of the stock and the ultimate properties required. Those skilled in the art can determine the best cure time and temperature by routine experiments. The state of cure is best determined by the value of the modulus at 300% extension, at 25° C. and the compression set at 70 or 100° C.

The invention will now be described with reference to the following examples of specific embodiments thereof wherein parts and percentages are by weight unless otherwise specified.

EXAMPLE 1

A. *Preparation of the elastomeric copolymer.*—An ethylene/propylene/1,4-hexadiene copolymer is made in tetrachloroethylene with a diisobutylaluminum chloride/vanadium oxytrichloride catalyst in accordance with the general procedures set out in U.S. Patent 2,933,480. The copolymer exhibits a Mooney viscosity (ML-4/250° F.) of about 70 and has the following approximate monomer unit composition by weight: 52% ethylene, 44% propylene, and 4% 1,4-hexadiene.

B. *Preparation of thiotrithiazyl chloride.*—This compound is prepared in the manner described by Meusen and Jakob [Anorg. Chemie, 263, 200 (1950)]. To a solution of tetrasulfur tetranitride in 75 ml. of carbon tetrachloride at 25° C. are added 75 ml. of dry carbon tetrachloride and 15 ml. of redistilled S$_2$Cl$_2$. After the mixture has refluxed at atmospheric pressure for one hour, it is cooled and filtered. The thiotrithiazyl chloride is obtained as a yellow solid. About 18.7 grams of $(NS)_3SCl$ are obtained after it has been washed with dry carbon tetrachloride and dried in a vacuum desiccator.

The tetrasulfur tetranitride may be prepared by the procedure described in Inorganic Syntheses, vol. VI, page 124. In a 5-liter flask are placed 3 liters of carbon tetrachloride (previously dried over phosphorus pentoxide) and 160 ml. of freshly distilled $S_2Cl_2$. After the solution has been saturated with chlorine, anhydrous ammonia is passed rapidly through it. The mixture becomes thick and hot and undergoes several color changes, finally turning salmon-pink after about 2.5 hours. Inflow of ammonia is stopped. The mixture is treated by the procedure described in Inorganic Syntheses. Tetrasulfur tetranitride is isolated from the dioxane extract as orange-red crystals; they are divided into four portions and stored under 75 ml. of dry carbon tetrachloride until used.

It is recommended that the preparation of tetrasulfur tetranitride not be carried out on a scale larger than ¼ of that described in the reference and then only when adequate shielding is provided. Although tetrasulfur tetranitride is not easily detonated (it has been ground dry without exploding), the possibility of explosions of considerable force exists. Tetrasulfur tetranitride has an energy equivalent to that of 2,4,6-trinitrotoluene. When a few of the orange-red crystals are struck by a hammer, a detonation of considerable violence occurs.

C. *Preparation of vulcanization stocks.*—Six stocks A–F are compounded on a rubber roll mill at 75–100° F. according to the recipe given in Table I below. Stocks B, D and F, which contained sulfur and are outside the scope of the present invention, are included only for purposes of comparison. All stocks are cured for 40 minutes at 160° C. and then they are subjected to tube aging for seven days at 150° C. The typical retention of original vulcanizate properties for each stock is indicated in Table I.

The naphthenic petroleum oil used (commercially available from Humble Oil and Refining Company as "Flexon 765") has a flash point of 445° F., a specific gravity (60/60° F.) of 0.8980, a Saybolt viscosity (210° F.) of 58 seconds, a viscosity gravity constant of 0.834, 0% N-bases, 1.5% first acidaffins, 28.3% second acidaffins, 70.2% paraffins, 0% aromatic carbon atoms, 45% naphthenic carbon atoms and 55% paraffinic carbon atoms.

TABLE I

| Common Components: | Parts by Weight |
|---|---|
| Copolymer | 100 |
| Zinc Oxide | 5 |
| HAF Carbon Black | 50 |
| Naphthenic Petroleum Oil | 20 |
| 2-Mercaptobenzothiazole | 0.5 |

| | Stocks | | | | | |
|---|---|---|---|---|---|---|
| | A | B* | C | D* | E | F* |
| Additional Components: | | | | | | |
| Tellurium diethyl dithiocarbamate | 1.5 | 1.5 | 0 | 0 | 0 | 0 |
| Tetramethyl thiuram disulfide | 0 | 0 | 1.5 | 1.5 | 0 | 0 |
| Zinc dimethyl dithiocarbamate | 0 | 0 | 0 | 0 | 1.5 | 1.5 |
| Sulfur | 0 | 1.5 | 0 | 1.5 | 0 | 1.5 |
| Thiotrithiazyl chloride | 2.5 | 0 | 2.5 | 0 | 2.5 | 0 |
| Tube Aging (40′ Cure) 7 days at 150° C.: | | | | | | |
| Tensile Strength (p.s.i.) | 1,025 | 1,550 | 1,590 | 1,040 | 1,830 | 1,300 |
| Extension at Break (Percent) | 300 | 210 | 280 | 180 | 290 | 220 |
| Percent Retention of Original $T_B$ | 69 | 47 | 61 | 35 | 47 | 34 |
| Percent Retention of Original $E_B$ | 70 | 48 | 64 | 39 | 58 | 44 |

* Control.

EXAMPLE 2

Example 1 is repeated except as follows: Two stocks A and B are compounded on a rubber roll mill according to the formula set out in Table II below. Stock B, which is cured with sulfur and is outside the scope of the present invention, is included only for purposes of comparison. The stocks are press cured for 40 minutes at 160° C. and then subjected to tube aging at 150° C. for a total of 21 days. Typical results are listed in Table II. The vulcanizate cured with thiotrithiazyl chloride exhibits better retention of its initial properties and has better absolute stress-strain properties. A plot of these data will reveal that it requires about 44% more time for the thiotrithiazyl chloride cured vulcanizate to lose 50% of its original extension at break than the control stock.

TABLE II

| Common Components: | Parts by Weight |
|---|---|
| Copolymer | 100 |
| Zinc Oxide | 20 |
| HAF Carbon Black | 50 |
| Naphthenic Petroleum Oil | 20 |
| Tetramethyl Thiuram Monosulfide | 1.5 |
| 2-Mercaptobenzothiazole | 1.5 |

| | Stocks | |
|---|---|---|
| | A | B* |
| Curing Agent: | | |
| Sulfur | 0 | 1.0 |
| Thiotrithiazyl Chloride | 2.5 | 0 |
| Press Cure 40′/160° C.: | | |
| Modulus at 300% Extension (p.s.i.) | 1,330 | 1,160 |
| Tensile Strength (p.s.i.) | 3,730 | 3,590 |
| Extension at Break (percent) | 510 | 540 |
| Tube Aging at 150° C.; 7 days: | | |
| Percent Retention Tensile Strength | 62 | 58 |
| Percent Retention Extension at Break | 73 | 67 |
| 14 days: | | |
| Percent Retention Tensile Strength | 50 | 47 |
| Percent Retention Extension at Break | 57 | 46 |
| 21 days: | | |
| Percent Retention Tensile Strength | 42 | 38 |
| Percent Retention Extension at Break | 45 | 33 |

* Control.

EXAMPLE 3

Example 1 is repeated except as follows: the vulcanization agent is thiotrithiazyl thiocyanate which is prepared according to the procedure described by Meusen and Jakob [Anorg. Chemie, 263, 200 (1950)]. One gram of thiotrithiazyl chloride, $(NS)_3S$—Cl, is dissolved in a small amount of concentrated sulfuric acid. After the resulting solution has been evacuated and warmed gently to remove hydrogen chloride, a 10-fold volume of glacial acetic acid is added. The mixture is cooled in ice water. Finally, a solution of 2 grams of potassium thiocyanate in 35 ml. of water is added with swirling. Thiotrithiazyl thiocyanate is obtained as orange crystals which are collected on a sintered disk filter, washed with water, and dried.

Two stocks A and B are prepared on a rubber roll mill at 75–100° C. according to the formulation in Table III. Stock B which contains sulfur is outside the scope of the present invention and is included only for purpose of comparison. Both stocks are press-cured for 30 minutes at 160° C. Then the vulcanizates are heat aged for seven days at 150° C. in a tube. Table III below gives the typical vulcanizate properties and the retention of the tensile strength and elongation after seven-day heat aging.

TABLE III

| Common Components: | Parts by Weight |
|---|---|
| Copolymer | 100 |
| Zinc Oxide | 5 |
| HAF Carbon Black | 50 |
| Naphthenic Petroleum Oil | 20 |
| Tetramethyl Thiuram Monosulfide | 1.5 |
| 2-Mercaptobenzothiazole | 0.5 |

| | Stocks | |
|---|---|---|
| | A | B* |
| Curing Agent: | | |
| Sulfur | 0 | 1.5 |
| Thiotrithiazyl Thiocyanate | 3 | 0 |
| Press Cure, 30′/160° C.: | | |
| Modulus at 300% Extension (p.s.i.) | 910 | 1,250 |
| Tensile Strength (p.s.i.) | 2,550 | 2,980 |
| Extension at the Break (percent) | 540 | 500 |
| Permanent Set at Break (percent) | 9 | 8 |
| Compression Set After 22 Hours at 70° C. (percent) | 18 | 19 |
| Shore A Hardness | 56 | 56 |
| Yerzley Resilience (percent) | 63 | 68 |
| Tube Aging, 7 days at 150° C.: | | |
| Tensile Strength (p.s.i.) | 1,180 | 1,210 |
| Extension at Break (percent) | 250 | 180 |
| Percent Retention of Original Tensile Strength | 46 | 41 |
| Percent Retention of Original Extension at Break | 46 | 36 |

*Control.

The state of cure obtained with 2.5 parts of thiotrithiazyl chloride is comparable to that obtained with 1.5 parts of sulfur in terms of extension at break and permanent set; however, the tensile strength and the modulus are lower in the thiotrithiazyl chloride vulcanizates. The rate of cure effected by thiotrithiazyl chloride, when the rate is expressed in terms of the ratio of the 300% moduli at 10 and 40 minutes time, is slightly lower for black stocks and slightly higher for clay stocks than the rates of cure observed in comparable sulfur cured stocks. Although the compression set, resilience and heat build-up values of thiotrithiazyl chloride cured stocks are in the range necessary for the vulcanizates to find practical uses, better values are generally obtained from comparable sulfur cured vulcanizates. Mooney scorch data indicate that the stocks compounded with thiotrithiazyl chloride require a longer time to show a 10-point rise; however, the minimum value is greater and shows that some scorch has occurred on the mill.

The compound $(NS)_3S-Br$ can be prepared from thiotrithiazyl chloride by the procedure described by Meusen and Jakob [Anorg. Chemie, 263, 200 (1950)]. It can be used in any of the above examples in place of the vulcanization agents employed therein.

Other copolymers of α-olefins and non-conjugated dienes are used by substituting them for the ethylene, propylene, 1,4-hexadiene copolymer of the above examples. Further, it is believed that this invention can be used to advantage in the curing of conventional diene rubbers such as natural rubber, cis-1,4-polyisoprene, cis-polybutadiene, styrene-butadiene (SBR) rubber, butyl rubber, chloroprene polymers and copolymers of α-olefins with polyolefins such as conjugated and non-conjugated dienes.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a process of curing a normally-solid, chain-saturated α-olefin hydrocarbon copolymer having side-chain ethylenic unsaturation which comprises subjecting said copolymer to curing conditions in the presence of a vulcanizing agent and a sulfur-cure accelerator compound; the improvement wherein said vulcanizing agent is a thiotrithiazyl compound of the furmula $(NS)_3S-X$, where X is selected from the group consisting of —Cl, —Br and —SCN.

2. A process as defined in claim 1 wherein said thiotrithiazyl compound is $(NS)_3S-Cl$.

3. A process as defined in claim 1 wherein said thiotrithiazyl compound is $(NS)_3S-Br$.

4. A process as defined in claim 1 wherein said thiotrithiazyl compound is $(NS)_3S-SCN$.

5. A process as defined in claim 1 wherein said copolymer is an ethylene, propylene, non-conjugated diene terpolymer.

No references cited.

JOSEPH L. SCHOFER, *Primary Examiner.*

D. K. DENENBERG, *Assistant Examiner.*